Figure 1:
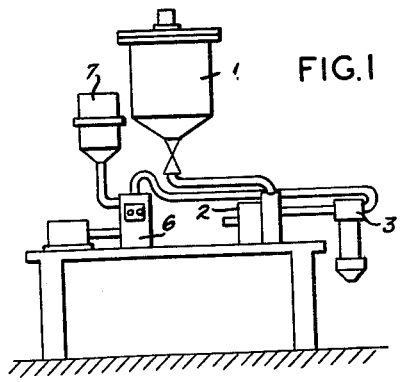

June 8, 1965   P. HOPPE ETAL   3,188,296
PROCESS FOR PREPARING POLYURETHANE PLASTICS
Filed Sept. 30, 1963   3 Sheets-Sheet 1

INVENTORS:
PETER HOPPE
ERWIN WEINBRENNER
CORNELIUS MUHLHAUSEN &
KARL BREER

By Clelle W. Upchurch

ATTORNEY,

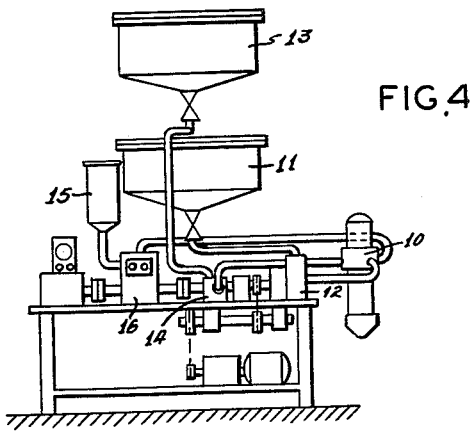
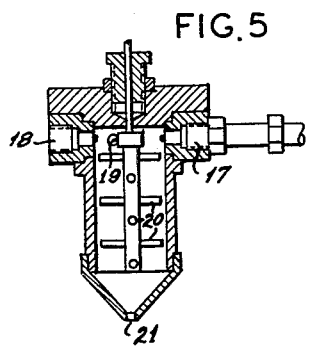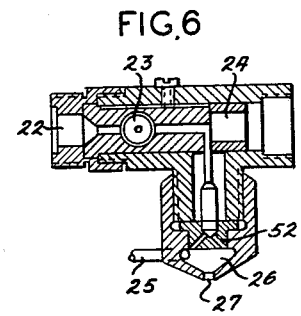

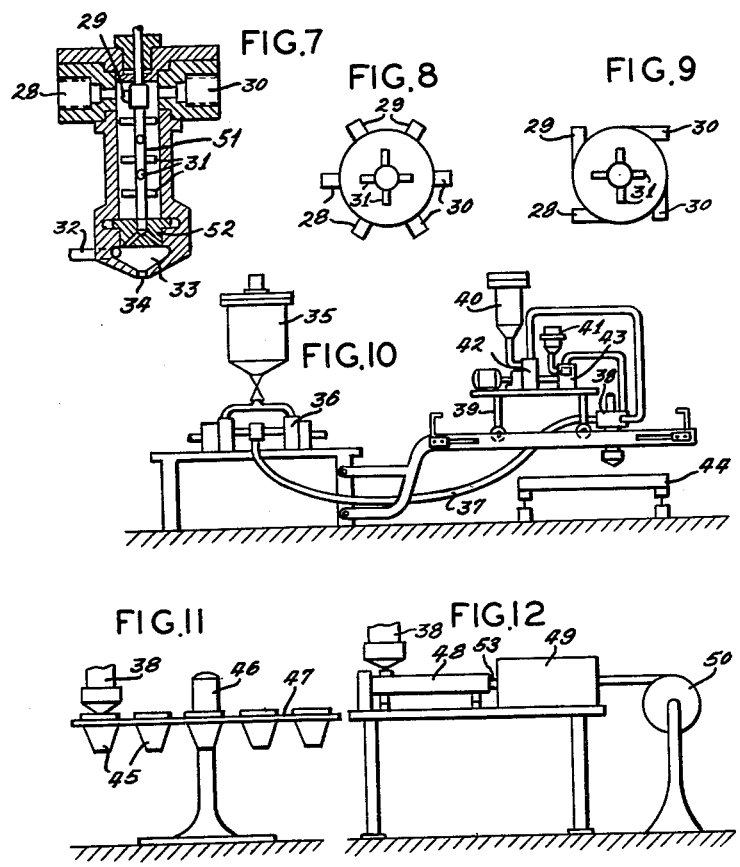

United States Patent Office 3,188,296
Patented June 8, 1965

3,188,296
PROCESS FOR PREPARING POLYURETHANE PLASTICS
Peter Hoppe, Troisdorf, Erwin Weinbrenner and Cornelius Mühlhausen, Leverkusen, and Karl Breer, Cologne-Flittard, Germany, assignors, by direct and mesne assignments, of one-half to Farbenfabriken Bayer Aktiengesellschaft, Leverkusen, Germany, a German corporation, and one-half to Mobay Chemical Company, Pittsburgh, Pa., a corporation of Delaware
Filed Sept. 30, 1963, Ser. No. 312,789
Claims priority, application Germany, Dec. 24, 1951, F 7,986
9 Claims. (Cl. 260—2.5)

This invention relates to an improved process and apparatus for the manufacture of porous and homogeneous polyurethane plastics of rigid, semirigid or elastic consistency. This application is a continuation-in-part of our co-pending application Serial No. 585,601, filed May 1, 1956, which is a division of application Serial No. 527,106, filed August 8, 1955, now U.S. Patent 2,764,565, a continuation-in-part of application Serial No. 327,522 filed December 23, 1952, now abandoned The formation of polyurethane plastics involves essentially a polyaddition between polyesters and polyisocyanates although, in compounding to obtain the final products, other materials, such as fillers, accelerators and/or cross-linking agents are desirably added. When foamed products are sought, water or an aqueous solution may also be employed. The plastic materials having a specific gravity of about 0.02–1.0 are porous and are classified as foamed plastics; those which have a specific gravity of about 1.0–1.4 are non-porous and are designated as homogeneous plastics.

The process of the invention involves a complex series of physical-chemical reactions wherein heat is evolved, viscosity changes are effected and rapid and uniform mixing of materials of widely different viscosities is necessary. By proceeding according to the present invention, applicants have been able to control these conditions to a degree heretofore unattainable and products may be produced which are not subject to the deficiencies of the prior art but are uniform in texture and reproducible in quality. Thus, in contrast to the prior art products, the plastics of the present invention are more uniform in appearance, have a more regular cell structure and are reproducible to a high degree. Shrinkage after curing (i.e., within a few minutes after the initial foam rise has been completed), which is a primary problem in the manufacture of light foams, is held to a minimum as a result of the present invention. Whereas it was considered essential to mix the components necessary for formation of the polyurethane plastics for several minutes in the prior art processes, the process of the invention (carried out in the apparatus invented therefor) normally requires a mixing time of the order 0.5 to 25 seconds.

In the formation of polyurethane plastics by the process of the instant invention, the condensation of polyesters and polyisocyanates is carried out in the presence of an "activator mixture" (the term "activator mixture," as used herein, is meant to include at least one accelerator and/or cross-linking agent to which may be added water or an aqueous solution, if necessary). The activator mixture is introduced into the reaction mixture in a fine state of subdivision at an elevated pressure substantially higher than that of the reactant mixture. Mixing of the components is effected in an enclosed vessel for a short period of time, and the resultant product is discharged while still in the liquid state and before any substantial liberation of gases has taken place. It is preferred to introduce the activator mixture into the polyester-polyisocyanate intermittently for most effective operation. However, it is possible to control conditions so that, in certain operations, a continuous feed for this component may be utilized. The activator mixture is introduced into the polyester-polyisocyanate shortly before the polyaddition reaction takes place; and the cross-linking action and/or foaming of the polyurethanes thereby becomes one of extremely high intensity and yields a more homogeneous product for use in the manufacture of moldings, cavity fillings, coatings, piece goods, etc.

The expression "component influencing the reaction," as hereinafter used, comprises the "activator mixture" defined above and/or any other material or combination of materials having a catalytic effect on the reaction between the polyisocyanate and the other reactants used in the manufacture of homogeneous and porous plastics.

Thus, in the process of the invention, an hydroxy polyester, a polyisocyanate and a component influencing the reaction are brought together in a mixing zone, with at least the reaction influencing component being injected at a pressure substantially higher than the back pressure in the mixing zone and then discharging the resulting uniform mixture of ingredients in the liquid state from said zone. The polyester and polyisocyanate may be introduced into the mixing zone either separately or in admixture; and the reaction influencing component may be introduced separately, or if desired, in admixture with the polyester or the polyisocyanate provided the latter is used in a blocked or inactive form which liberates the polyisocyanate on heating. Polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols may also be utilized in the process.

The polyesters used for the production of the polyurethanes having a specific gravity in the range of about 0.02–1.4 (i.e., those of rigid, semirigid or elastic consistency) may be branched and/or linear. Thus, the useful polyesters and/or polyesteramides may include those obtained by condensing any polybasic (preferably dibasic carboxylic) organic acid, such as adipic, sebacic, 6-aminocaproic, phthalic, isophthalic, terphthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-(beta-hydroxyethyl) ether, etc., and/or amino-alcohols such as ethanolamine, 3-aminopropanol, 4-aminopropanol, 5-aminopentanol-1,6-aminohexanol, 10-aminodecanol, 6-amino-5-methylhexanol-1, p-hydroxymethylbenzylamine, etc.; and with mixtures of the above poly-alcohols and amines (ethylene diamine, hexamethylene diamine, 3-methylhexamethylene diamine, decamethylene diamine, and m-phenylene-diamine, etc) and/or amino-alcohols, etc. In the esterification, the acid per se may be used for condensation or, where desirable, equivalent components, such as the acid halide or anhydride may be used.

The alkylene glycols and polyoxyalkylene glycols used in the practice of the invention may comprise ethylene glycol, propylene glycol, butylene glycol-2,3; butylene glycol-1,3; 2-methyl pentanediol-2,4; 2-ethylhexanediol-1,3; hexamethylene glycol, styrene glycol and decamethylene glycol, etc., and diethylene glycol, triethylene glycol, tetraethylene glycol, polyethylene glycols 200, 400, and 600, etc., dipropylene glycol, tripropylene glycol, polypropylene glycols 400, 750, 1200 and 2000, etc.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed in the process of the invention and condensed in the apparatus useful for carrying out that process. Moreover, any organic compound containing at least two radicals selected from the class consisting of hydroxyl and carboxyl groups may be employed in the practice of the invention.

The organic polyisocyanates useful in the practice of the invention include ethylene diisocyanate, ethylidene diisocyanate, propylene-1,2-diisocyanate, butylene-1,3,-diisocyanate, hexylene-1,6-diisocyanate, cyclohexylene-1,2-diisocyanate, m-phenylene diisocyanate, 2,4-toluylene diisocyanate, 2,6 - toluylene diisocyanate, 3,3' - dimethyl-4,4'-biphenylene diisocyanate, 3,3' - dimethoxy - 4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,5-naphthalene diisocyanate, etc.

The activator mixture is made up of at least one cross-linking agent and/or an accelerator and may contain, if desired, added water or an aqueous solution. The addition of such an activator mixture to the mixture of polyisocyanates and polyesters initiates the cross-linking action needed to obtain homogeneous plastics or the cross-linking and foaming action necessary to obtain foam plastics. Useful cross-linking agents include water or aqueous solutions for foamed plastics and the polyalcohols, such as ethylene glycol, propylene glycol, butylene glycol, diethylene glycol, triethylene glycol, glycerol, etc., for nonporous plastics; and useful accelerators include the tertiary amines (either individually or in mixtures) such as dimethylhexahydroaniline, diethylhexahydroaniline, reaction products of N,N'-diethylaminoethanol and phenylisocyanate, esteramines, etc. Also, sodium phenolates, added with suitable plasticizers, may be employed in the manufacture of foamed products.

As has been indicated above, it is desirable and advantageous to introduce the activator mixture, in a very fine state of subdivision and under relatively high pressure, into the polyester-polyisocyanate mixture before polyaddition occurs. The required amount of activator mixture, which is small compared with the other components, is injected into the mixture of isocyanate and polyester under high pressure and preferably by means of one or more injection nozzles and intermittently operating pumps, for instance by means of the devices hereinafter described.

According to one embodiment of the invention, the activator mixture is introduced or injected intermittently into a continuous stream of polyisocyanate and polyester, which stream is advanced by standard means such as a gear pump system. To insure adequate penetration of the activator mixture into the reaction mixture, the intermittent feed enters through a nozzle or nozzles at a relatively high pressure and frequency.

To carry out the above described process, an apparatus is employed which includes an enclosed reaction or mixing device, means for inducing continuous flow of initial materials such as the isocyanate-polyester mixture and means for intermittently introducing the activator mixture into the reaction mixture at elevated pressure. More particularly, the apparatus preferably includes at least one injection device to effect the proper intermittent feed of the activator mixture through a nozzle or another suitable device into the continuous stream of the initial materials.

In a preferred embodiment of the invention, the two reaction components of the reaction mixture, namely at least one diisocyanate and at least one polyester containing hydroxyl groups, are conveyed separately to a reaction or mixing device into which they are injected under pressure through separate nozzles or a common mixing nozzle and the activator mixture is either conveyed separately to the reaction device and injected into it under pressure through a separate nozzle or a common mixing nozzle.

The activator mixture may advantageously be conveyed to the reaction or mixing device in admixture with the polyester component, the mixture being injected under pressure into the device either through a common mixing nozzle with the iscoyanate component or through a separate nozzle. Similarly, in some operations, particularly in the production of homogeneous plastics, the activator mixture may be conveyed to the reaction or mixing device in admixture with the polyisocyanate if the latter is employed in a blocked or inactive form which liberates the polyisocyanate on heating.

In the practice of the invention in its preferred form, the components employed in the manufacture of the plastic are forced into a common reaction or mixing device by means of pumps. One of the pumps operates continuously while the other pumps operate intermittently; all of the pumps are connected to the reaction or mixing device into which one component is introduced continuously while the activator mixture or preferably the activator mixture and the polyisocyanate are introduced intermittently. The components conveyed by the pumps are introduced by means of nozzles into the reaction or mixing device which has outlet means through which the final mixture is discharged in the liquid state.

Broadly stated, the apparatus of the invention comprises, in combination, an enclosed mixer and means through which the components (i.e., polyester containing free hydroxyl groups, polyisocyanate and reaction influencing component) used in the manufacture of the plastics are brought together in said mixer, at least one of said means comprising an injector operating at a pressure substantially higher than that in said mixer, and outlet means through which the final uniform mixture of components is discharged in the liquid state.

More specifically, the apparatus for carrying out the process of the invention comprises, in combination, an enclosed mixer, means to effect a continuous flow of initial materials (polyisocyanate and polyester or polyisocyanate-modified polyester) to the mixer, means for feeding the activator mixture and/or polyisocyanate and means for intermittently injecting the activator mixture and/or polyisocyanate in precise quantities into a continuous stream of the initial materials by means of at least one injection nozzle. Still more specifically, the apparatus includes a similar combination of elements together with means for separately and intermittently injecting the polyisocyanate and the activator mixture under pressure into a continuous stream of the initial material by means of injection nozzles.

The initial material or materials and the accelerator mixture are generally stored in tanks and are conveyed to the reaction or mixing device by means of pumps which, as indicated above, operate continuously but preferably intermittently in the case of the accelerator and/or the polyisocyanate. Any other standard method of storing and transferring the materials to the reaction or mixing device may be used.

The reaction or mixing device may contain separate compartments or chambers for injection of the reaction components and mixing. It is possible, however, to arrange the device so that both injection and mixing are carried out in a single compartment.

In the single chamber apparatus, the components conveyed by the pumps are fed (the polyester preferably by continuous flow; the accelerator mixture and polyisocyanate preferably by intermittent injection) through nozzles into a chamber equipped with stirring means (e.g., a mechanical stirrer) as well as outlet means through which the final mixture is discharged in the liquid state. In another embodiment of the single chamber apparatus (see FIG. 3), the components conveyed by the pumps are forced (the mixture of polyisocyanate and polyester in continuous flow and the accelerator mixture by intermittent injection) through nozzles into an injection chamber provided with outlet means through which the final mixture is discharged in the liquid state.

Where a 2-compartment device used, one or more of the reaction components required to form the desired plastic is introduced into the injection chamber continuously while another component including the activator mixture is intermittently injected into the continuous flow of the other components. Further mixing is then effected in a separate chamber by a desirable stirring means. According to one embodiment of the two chamber apparatus of the invention, the reaction or mixing device is divided by means of a nozzle plate into the injection chamber wherein the components are added and partially mixed and the mixing chamber wherein a more thorough mixing is effected. Any suitable stirring means may be used for this purpose. Thus, the mixing chamber may be provided with a tangential air feed connection through which compressed air is introduced into the mixing chamber to effect a turbulent flow and thorough mixing of the components. Alternatively the apparatus may be divided by a nozzle plate into one compartment equipped with a mechanical stirrer and another compartment provided with a tangential air pipe connection for compressed air stirring.

The introduction of air into a mixture of components which will react to form a cellular polyurethane plastic results in bubbles of air becoming entrapped in the viscous reaction mixture. The product obtained upon chemical reaction of the components making up the reaction mixture has a much improved pore structure over that produced by a similar reaction mixture not containing air bubbles. The pore structure obtained when the reaction mixture contains air bubbles is more uniform than that obtained when no air bubbles are present and the product is substantially free from large oversized cells or voids. Consequently, the density of the product produced from a reaction mixture containing air bubbles is smaller and more uniform than the product obtained from a similar mixture not containing air bubbles. The product also has improved tensile strength and the compression strength is more uniform because of the absence of large oversized cells or voids therein.

Although air is the most convenient inert gas and is preferred, any other inert gas, that is, any gas which will not chemically react with the components of the reaction mixture, may be introduced into the viscous reaction mixture to produce a more uniform structure. For example, nitrogen or carbon dioxide may be added to the reaction mixture instead of air or along with the air to supplement the mixing obtained through the injection process and, at the same time, improve the structure of the resulting cellular polyurethane. Although it is most convenient to introduce the air or other inert gas into the reaction mixture under pressure, it is, of course, to be understood that the inert gas may be mixed with the reaction mixture by any other means, such as by beating it into the liquid with rapid agitation. The latter process is more difficult, however, because of the viscosity of the reaction mixture. It is also possible to add the air to the organic polyisocyanate or other reactant and introduce it into the reaction mixture with the reactant.

Any amount of inert gas introduced into the viscous reaction mixture will result in some improvement in the product. However, seldom will it be necessary to add more inert gas than that equivalent to about 50% of the volume of the resulting mixture of chemical components and air. Otherwise stated the density of the foamable reaction mixture which usually is approximately 1 is reduced by adding inert gas to about 0.5 before evolution of carbon dioxide initiates a further decrease of the density of the resulting foam. Usually, not more than about 20% inert gas based on the volume of the reaction mixture will be required. In other words, usually not more than about 20 parts by volume of air per 80 parts of reaction mixture will be used. The inert gas may be added to the reaction mixture immediately before it is discharged from the mixing device or it may be added near the top of the mixing chamber substantially immediately after the components have been injected into the mixing zone.

When preparing a cellular polyurethane plastic from a polyoxyalkylene glycol, it is preferred to prepare a prepolymer or, in other words, to prepare a polyisocyanate-modified polyoxyalkylene glycol under substantially anhydrous conditions by reacting the polyoxyalkylene glycol with an organic polyisocyanate to form a product having terminal NCO groups and to mix this prepolymer with water and inert gas to bring about cross-linking and form a cellular polyurethane plastic. A polyoxyalkylene glycol, polyester or other organic compound having at least two reactive hydrogen atoms capable of forming a polyurethane may have any suitable molecular weight, but it is preferred that it have a molecular weight of at least 500 and an hydroxyl number of not more than about 224. If a polyester is used, the acid number thereof preferably should not exceed 2. A reaction mixture containing bubbles of an inert gas is particularly advantageous for making a cellular polyurethane article which must be shaped by bringing about chemical reaction in a closed mold. Crash pads on the instrument panel of vehicles are made in such a mold.

The mixing time may be varied depending on the proportions and character of the components employed as well as the type of plastic desired. Normally the mixing time is in the range of 0.5–25 seconds, although longer or even shorter mixing periods may in some cases be desirable. The final reaction mixture, in the liquid state, may be treated in various manners. For example, it may be passed onto a screw conveyor which forces the mixture through appropriately shaped nozzles to produce moldings of any desired design or insulating coverings for cables. Sometimes it is desirable to complete and/or accelerate the reaction of the liquid mixture issuing from the mixing chamber by heating. And this, of course, may be done.

To the polyisocyanates one may add, in anhydrous condition, oils such as paraffin oils (or other mineral oils) or surface-active substances to serve as activators for facilitating the feeding of the isocyanate. Such oils may also be added to one or more of the other components used in the formation of the plastics. These oils affect the porosity and/or density of the final product, which may be varied by varying the quantity of anhydrous oil added.

For continuous or conveyor belt manufacture of plastics, foamed products or foils, the apparatus of the invention may be made up essentially of storage means (i.e., a storage tank) and a metering pump mounted on a stationary support; and two similar storage means attached to metering pumps mounted on an oscillating casting carriage which moves transversely to the conveyor belt. The components are injected through nozzles by means of the pumps into the reaction or mixing device which is mounted on the oscillating casting carriage.

For the production of foils the carriage moves transversely to the conveyor belt which slowly travels transversely to the moving direction of the casting carriage.

For the production of moldings the liquid mixture issuing from the mixing chamber is cast into molds arranged and positioned on a turntable. The discharge of the mixture from the mixing chamber is controlled and adjusted in proper relation to the travelling velocity of the molds. In the continuous manufacture of profile cords or hollow articles for the coating of wire or similar hollow articles the mixture issuing from the mixing chamber is introduced into a conveyor screw which forces the almost completely reacted material through appropriately shaped profile nozzles. After issuing from the mixing chamber, the material is passed into a chamber where it is hardened by completing the reaction. The product is then wound up on a roller.

The apparatus according to the invention can be adapted for instance, for the manufacture of porous and homogeneous plastics having a basis of polyurethanes. The apparatus for carrying into effect this embodiment of the invention consists essentially of a pump for inducing continuous flow of the initial material, e.g., a mixture of a polyisocyanate and a polyester, and another pump intermittently feeding the activator component, e.g., tertiary amines, into the continuous stream of the initial material. The continuous flow of the initial material and the intermittent flow of the accelerating liquid are contacted in the reaction or mixing device into which both streams are admitted separately through nozzles. The apparatus may also be provided with three pumps, one of these pumps inducing a continuous flow of the polyester component, another pump intermittently feeding the isocyanate component while the third pump intermittently feeds the activator component under high pressures.

An important feature of the invention resides in the manner in which the activator mixture is added to the remaining components used to form the plastics. The activator mixture is forced into the polyester stream (mixed with the polyisocyanate if desired) at a relatively high velocity so that it will adequately penetrate the high viscosity polyester and form a uniform product. This is effected by means of an injection nozzle through which the activator mixture is introduced at a pressure substantially in the range of about 300 p.s.i. to about 15,000 p.s.i. and preferably within the range of about 1200 p.s.i. to about 5250 p.s.i.

In its broadest aspect, the invention contemplates the use of injection pressures which are higher and preferably substantially higher than the back pressure within the reaction or mixing device. Normally, the back pressure within the device is of the order of from 45 p.s.i. to 75 p.s.i. depending upon the viscosity of the material and the size of the discharge outlet. In the case of low viscosity materials, the back pressure may drop to as low as 17 p.s.i., but with more highly viscous materials, it may increase to much higher values than are normally encountered.

Thus, in the case of low viscosity materials, the injection pressure may fall as low as about 19 p.s.i. or in the case of moderately viscous materials it may drop to a value of about 47 p.s.i. to 77 p.s.i. Under these conditions substantially improved results over mechanical mixing are obtained, but such low pressures are not the equivalent of 300 p.s.i. and higher pressures since pressures of the latter order of magnitude result in more rapid and efficient mixing and products more uniform in texture and reproducible in character. Apparently there is no upper limit to the injection pressure that may be employed except that imposed by the equipment.

The injection nozzle also serves as a check valve since, when the pressure is lowered, the nozzle closes and the other reactants cannot back into the accelerator mixture feed line. Without such mechanical safeguard, the activator mixture feed line would quickly become blocked by solid material and the desired mixing operation could not be effected.

Figure 2:
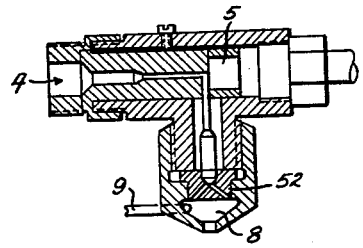
Figure 3:
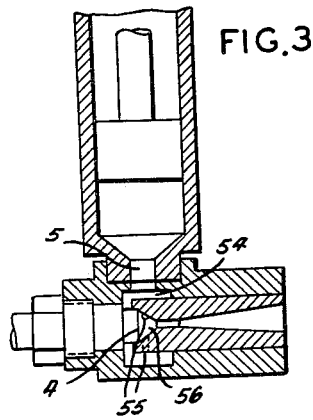

The invention will now further be described with reference to various forms of apparatus suitable for producing porous and homogeneous plastics, which are illustrated in the accompanying drawings and in which:

FIG. 1 is a diagrammatic elevation of an apparatus for mixing the reaction mixture and activator, FIGS. 2 and 3 are longitudinal sections through reaction devices, FIG. 4 shows a diagrammatic elevation of an apparatus suitable for carrying out the modification of the process for mixing two components of the reaction mixture and activator, FIGS. 5, 6 and 7 are longitudinal sections through reaction or mixing devices for the activator and two components of the reaction mixture, FIGS. 8 and 9 show in corresponding transverse section two possible arrangements of the nozzles of the reaction or mixing device, FIG. 10 is a diagrammatic elevation of an apparatus for mixing the two components of the reaction mixture and activator and casting the product, FIG. 11 is a diagrammatic elevation of a turntable equipped with molds, FIG. 12 is a diagrammatic elevation of an apparatus for producing profile cords or hollow articles or the like.

Referring now to FIG. 1, an initial liquid reactant mixture of polyisocyanate and polyester, charged into tank 1, is passed to a gear pump 2 having a variable number of revolutions, which forces the reaction mixture at any desired rate through a reaction or mixing device 3 as illustrated in FIG. 2 or 3. This reaction or mixing device essentially consists of a feed pipe 5 for the reaction mixture and an injection nozzle 4 for the activator component through which the activator component is intermittently injected into the continuously flowing initial reaction mixture, either transversely to the flowing direction of the initial reactant mixture (see FIG. 3) or in counter-current to the initial reactant mixture (see FIG. 2). Injection in counter-current to the flow of the initial reactant mixture, wherein the initial reactant mixture is preferably passed around the nose of the nozzle, has proved to be especially suitable. The injection impulses of the nozzle 4 are effected by the injection pump 6 (as shown in FIG. 1), which is supplied with the activator component from the tank 7. After injection, the mixture is forced through a nozzle plate 52 into a chamber 8 into which a continuous compressed air stream is passed through a tangential airpipe connection 9. The air stream effects an intense mixing of the reactive and expansible material, or the mixing operation is performed by means of a mechanically operating stirring equipment (see FIGS. 5 and 7). In the tangential-transverse mixing operation shown in FIG. 3 the reaction mixture enters the ring chamber 54 through the feed pipe 5 and is then forced through the slots 55 to the mixing chamber 56, where intense mixing with the activator mixture intermittently injected through the nozzle 4 is effected. A second mixing operation by air or mechanically is not required.

The product, while still liquid, leaves the chamber in which the second mixing operation is carried out, and is cross-linked, rapidly or slowly, depending upon the character of the polyester-isocyanate-accelerator system employed, or is cross-linked and expanded. By suitable selection of the polyisocyanate-polyester mixture employed, the cross-linking and the blowing action can be accelerated in such a manner that cross-linked profile pieces or finished foamed plastics are promptly obtained after discharge of the mixture from the mixing chamber.

FIG. 4 shows an apparatus suitable for carrying out the modification of the process in which, for instance, a polyester containing hydroxyl groups, a diisocyanate and an activator component, e.g., an accelerator and/or cross-linking agent are all conveyed separately to the reaction or mixing device 10. The polyester is continuously fed from the storage tank 11 into the reaction or mixing device 10 by means of the pump 12 and, simultaneously but separately, a polyisocyanate is injected into the reaction or mixing device 10 from the storage tank 13 intermittently by means of the pump 14 and an activator from the storage tank 15 intermittently by means of the pump 16.

The reaction or mixing device 10 may be designed in various manners, for instance as shown in FIGS. 5, 6, 7, 8 and 9.

In the reaction or mixing device shown in FIG. 5, the components admitted through the nozzles 17, 18 and 19 are further mixed by means of the stirrer 20. The mixture thus obtained leaves the device through the outlet 21.

In the reaction or mixing device shown in FIG. 6 the components initially mixed by injection through the nozzles 22 and 23 and pipe 24 are finally mixed in the mixing or turbulence chamber 26 by means of a continuous air-current which is passed in tangentially through the pipe 25. The final mixture leaves the turbulence chamber through the outlet 27.

FIG. 7 shows a reaction or mixing device wherein the mixing operation is initially effected by injection, continued with a stirrer and completed by means of an air-current admitted tangentially. The components enter the injection chamber 51 separately through the nozzles 28, 29 and 30; they are further mixed in this chamber by means of the stirrer 31, forced through the nozzle plate 52 into the mixing or turbulence chamber 33, wherein they are finally mixed by the action of an air-current passed in through a tangential air-pipe connection 32; the mixture leaves the turbulence chamber 33 through the outlet 34.

FIGS. 8 and 9 show two possible arrangements of the peripherally disposed nozzles 28, 29 and 30 opening into the reaction device (shown in FIG. 7).

FIG. 10 shows an apparatus for the manufacture of rigid and elastic polyurethane products, which enables block material to be produced in a continuous flow, or plastic or foamed plastic foils to be produced on a continuously travelling conveyor belt. Polyester is conveyed from a stationary tank 35 by means of the stationary pump 36 through a flexible tube 37 to a reaction or mixing device 38 (similar to numeral 10 in FIG. 4) mounted on a movable and oscillating carriage 39. A storage tank 40 for the isocyanate and a storage tank 41 for the accelerator mixture are mounted on the carriage 39. From the tank 40 the isocyanate is conveyed to the reaction or mixing device 38 by means of an injection pump 42, and from the tank 41 the accelerator mixture is conveyed to the reaction or mixing device 38 by means of an injection pump 43. For the production of foils, the final mixture issuing from the mixing chamber is deposited on a conveyor belt 44 arranged beneath the carriage 39 and slowly travelling transversely to the moving direction of the carriage 39.

The apparatus disclosed in FIGURE 10 is also adapted for use with a two-component feed system in the continuous manufacture of rigid and elastic polyurethane sheets or blocks or in the continuous production of plastic or foamed plastic foils on a continuously travelling conveyor belt. Using a two component system, the mixture of isocyanate and polyester, initially charged in tank 35, is continuously conveyed therefrom by means of a stationary dosing pump 36 through the flexible tube 37 to the reaction or mixing device 38 mounted on a movable and oscillating carriage 39. From the accelerator storage tank 41, also mounted on carriage 39, the accelerator mixture is conveyed and intermittently injected into the reaction device by means of the injection pump 43. For the production of foils, the final mixture issuing from the mixing chamber is deposited on the conveyor belt 44 arranged beneath the carriage 39, which slowly travels transversely to the moving direction of the carriage 39.

FIG. 11 shows a device for producing moldings from foamed products, for instance from polyurethanes. The mixture issuing from the reaction or mixing device 38 is cast into molds 45 which are arranged and positioned, preferably evenly spaced, on a turntable 47 driven by the engine 46. The molds 45 are preferably filled at a rate so that the travelling motion of the molds is in proper relation to the rate of the mixture issuing from the reaction device 38.

FIG. 12 shows a device for producing, for instance, profile cords or cable coverings from materials having a basis of polyurethanes. After leaving the reaction device 38 the mixture is passed to or drops into a screw conveyor 48 which forces it through a mouth piece 53 provided with profile nozzles into a chamber 49 wherein the shaped article is hardened and then led to a roll 50 to be wound up.

The invention is further illustrated but not limited by the following examples:

*Example 1*

A mixture of 100 parts by volume of a polyester prepared from 16 mols of adipic acid, 16 mols of diethylene glycol and 1 mol of trimethylolpropane, and 25 parts by volume of toluylene diisocyanate is charged into tank 1 (FIG. 1) and held at a temperature of 27 C. This mixture is fed continuously to the reaction or mixing device 3 at a rate of 2 liters per minute. The activator mixture consisting of 3 parts by volume of the adipic acid ester of N-diethylaminoethanol, 2 parts by volume of ammonium oleate and 1.2 parts by volume of water is stored in tank 7 at a temperature of 18° C. and intermittently injected into the stream of the polyester-isocyanate mixture at a pressure increasing from 1470 p.s.i. to 5145 p.s.i. and at a rate of 0.08 liter per minute. This corresponds to a feed rate of 4 parts by volume of activator mixture for each 100 parts by volume of the isocyanate-polyester mixture and involves an injection rate of 1500 injections per minute. The temperature rises to 37° C. in the mixing chamber and during the foaming process, a temperature of about 100° C. is reached inside the foaming mass. The final elastic foam has a bulk density of 70–75 kg./m.$^3$.

*Example 2*

100 parts by volume of a polyester prepared from 16 mols of adipic acid, 16 mols of diethylene glycol and 1 mol of trimethylolpropane, held at a temperature of 22° C., 47 parts by volume of toluylene diisocyanate, held at a temperature of 18° C., and 10 parts by volume of an activator mixture as described below, held at a temperature of 18° C., are brought together using the apparatus diagrammatically represented by FIG. 4. The activator mixture consists of 3 parts by volume of the adipic acid ester of N-diethyl amino ethanol, 1 part by volume of ammonium oleate, 1.5 parts by volume of sulfonated castor oil, 1.5 parts by volume of water and 0.5 part by volume of a paraffin oil. The polyester is fed continuously to the reaction or mixing device 10 at a rate of 4 liters per minute, the diisocyanate at a rate of 2 liters per minute and the activator mixture at a rate of 0.4 liter per minute, respectively. The diisocyanate and the activator mixture are injected intermittently using 9000 injections per minute and 3000 injections per minute, respectively. In the mixing chamber the temperature rises to 27° C. and in the foaming mass a temperature of 130° C. is reached. The final elastic foam has a bulk density of 35 kg./m.$^3$.

*Example 3*

A rigid foam with a bulk density of 75 kg./m.$^3$ is produced from the following mixture:

50 parts by weight of a polyester prepared from 2.5 mols of adipic acid, 0.5 mol of phthalic acid and 4 mols of trimethylol propane; 50 parts by weight of a polyester prepared from 3 mols of adipic acid, 1 mol of hexanetriol and 3 mols of 1,3-butylene glycol; and 10 parts by weight of activated charcoal are mixed and hereinafter referred to as "polyester mixture." 1 part by volume of the adipic acid ester of N-diethylaminoethanol, 1 part by volume of ammonium oleate and 2 parts by volume of sulfonated castor oil are mixed and hereinafter referred to as "activator mixture."

100 parts by volume of the "polyester mixture," 75 parts by volume of toluylene diisocyanate, and 4 parts by volume of the "activator mixture," held at temperatures of 40° C., 18° C. and 18° C., respectively, are mixed by means of a reaction or mixing device diagrammatically represented in FIG. 4. To each 4.5 liters of "polyester mixture" passing each minute in continuous stream into the reaction or mixing device, 3.4 liters of toluylene diisocyanate and, separately, 0.18 liter of "activator mixture" are injected intermittently at a rate of 9000 and 3000 injections per minute, respectively. The temperature rises to 27° C. in the mixing chamber and to 180° C. in the foaming mass during the foaming process.

*Example 4*

A rubber-like elastic polyurethane is obtained in the following way:

A mixture of 100 parts by volume of a polyester prepared from 11 mols of ethylene glycol and 10 mols of adipic acid with 25 parts by volume of 1,5-naphthalene-diisocyanate is fed continuously at a temperature of 120° C. and at a rate of 2 liters per minute to a mixing device 3 (FIG. 1). 2 parts by volume of butylene glycol are introduced into each 125 parts by volume of the continuous stream of polyester-polyisocyanate mixture at a rate of 1500 injections per minute, the butylene glycol serving as a cross-linking agent. The reaction mixture is cast at a temperature of 130° C. into molds pre-heated to 100° C. The molding is then heated to 100° C. for 24 hours.

*Example 5*

About 100 parts by weight of a polyoxyalkylene glycol prepared by condensing propylene oxide having a molecular weight of about 2000 and an OH number of about 56 are mixed with about 3 parts by weight trimethylolpropane and about 0.02 part benzoyl chloride. This mixture is heated to about 60° C. and about 36 parts by weight of an 80/20 mixture of 2,4-toluylene diisocyanate and 2,6-toluylene diisocyanate are added. The resulting mixture is stirred and heated to a temperature of from about 90° C. to about 100° C. until polyisocyanate modified polyoxyalkylene glycol having terminal isocyanate groups has been formed. This prepolymer, along with any unreacted toluylene diisocyanate present in admixture therewith, is pumped into mixing chamber 51 through nozzle 28. A mixture of about 2 parts ethylmorpholine and about 1.5 parts by weight water is injected through nozzle 30 into the mixing chamber and into the polyisocyanate modified polyoxyalkylene glycol. The injection pressure is greater than the back pressure in the mixing chamber and is preferably about 1470 p.s.i. or higher. Air is introduced through tangential air pipe connection 32 and is mixed with the reaction mixture until air bubbles are substantially uniformly dispersed in the reaction mixture. The reaction mixture containing air bubbles is discharged through opening 34 and chemical reaction is brought about to form a cellular polyurethane plastic having an improved cellular structure.

Where reference is made in the specification and claims to "intermittently" or "intermittent feed," it is to be understood that these expressions are intended to designate an injection rate of about 50 to about 10,000 and preferably about 2000 to about 10,000 injections per minute.

In addition to the various uses mentioned earlier herein, the products prepared by the process of the instant invention are useful in all of the applications set forth in application Serial No. 327,522.

It is to be understood that any other suitable organic compound having at least two reactive hydrogen atoms, such as a polyester or polythioether, may be substituted for the polyalkylene ether glycol in the foregoing Example 5. Moreover, one of the other organic polyisocyanates disclosed herein may be substituted for the 2,4-toluylene diisocyanate. Any other suitable catalyst or accelerator may be substituted for ethyl morpholine. Likewise, variations may be made in the amounts of each ingredient used in formulating the reaction mixture to provide cellular polyurethanes having specific physical characteristics. The amount of air mixed with the reaction mixture will be sufficient to give the reaction mixture a creamy appearance, and, in the foregoing example is about 20% by volume of the total volume of liquid discharged from the mixing device. As indicated hereinbefore, any suitable organic compound having at least two reactive hydrogen atoms and any organic polyisocyanate which will react together to form a polyurethane plastic may be used. The amount of organic polyisocyanate used will vary but it is preferred to use an excess of organic polyisocyanate over that required to react with all of the reactive hydrogen atoms of the organic compound reacted therewith. Preferably, from 20% to 250% excess organic polyisocyanate over that required to react with all of the reactive hydrogen atoms of the organic compound capable of reacting therewith to form a polyurethane will be used. Particularly good results are obtained when an organic compound having at least two reactive hydrogen atoms and a molecular weight of at least 1000 is used.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process which comprises mixing an organic polyisocyanate, an organic compound having at least two reactive hydrogen atoms and air and allowing the resulting mixture to react to form a cellular polyurethane, the air being added as a stream of compressed air and being substantially uniformly dispersed in the said mixture, said organic compound being capable of forming a polyurethane by reaction with said organic polyisocyanate and having a molecular weight of at least about 500, an hydroxyl number of not more than about 224 and an acid number of not more than about 2.

2. A process which comprises mixing an organic polyisocyanate, a member selected from the group consisting of a polyester prepared by esterification of a polycarboxylic acid and a polyhydric alcohol, a polyoxyalkylene glycol, an isocyanate-modified polyester prepared by reacting an excess of organic polyisocyanate with a polyester which has been prepared by esterification of a polycarboxylic acid and a polyhydric alcohol, and air and allowing the resulting mixture to react to form a cellular polyurethane, said air being added as a stream of compressed air and being substantially uniformly dispersed in the said mixture, said polyesters and polyoxyalkylene glycol having a molecular weight of at least about 500, an hydroxyl number of at least about 224 and an acid number of not more than about 2.

3. A process which comprises mixing an organic polyisocyanate, an organic compound having at least two reactive hydrogen atoms and up to about 50 parts by volume of air, based on the total volume of the resulting reaction mixture, and allowing the said mixture to react to form a cellular polyurethane, the air being added as a stream of compressed air and being substantially uniformly dispersed in the said mixture, said organic compound being capable of forming a polyurethane by reaction with said organic polyisocyanate and having a molecular weight of at least about 500, an hydroxyl number of not more than about 224 and an acid number of not more than about 2.

4. The process of claim 3 wherein the said group member is a polyoxyalkylene glycol.

5. A process which comprises mixing an organic polyisocyanate, an organic compound having at least two reactive hydrogen atoms and an inert gas and allowing the resulting mixture to react to form a cellular polyurethane, the inert gas being added as a stream of compressed gas and being substantially uniformly dispersed in the said mixture, said organic compound being capable of forming a polyurethane by reaction with said organic polyisocyanate and having a molecular weight of at least about 500, an hydroxyl number of not more than about 224 and an acid number of not more than about 2.

6. A process which comprises mixing an organic polyisocyanate, a member selected from the group consisting of a polyester prepared by esterification of a polycarboxylic acid and a polyhydric alcohol, a polyoxyalkylene glycol, an isocyanate-modified polyester prepared by reacting an excess of organic polyisocyanate with a polyester which has been prepared by esterification of a polycarboxylic acid and a polyhydric alcohol, and an inert gas and allowing the said mixture to react to form a cellular polyurethane, said inert gas being added as a stream of compressed gas and being substantially uniformly dispersed in the said mixture, said polyesters and polyoxyalkylene glycol having a molecular weight of at least about 500, an hydroxyl number of at least about 224 and an acid number of not more than about 2.

7. A process which comprises mixing an organic polyisocyanate, an organic compound having at least two reactive hydrogen atoms and up to about 50 parts by volume of inert gas, based on the total volume of the resulting reaction mixture, and allowing the said mixture to react to form a cellular polyurethane, the gas being added as a stream of compressed gas and being substantially uniformly dispersed in the said mixture, said organic compound being capable of forming a polyurethane by reaction with said organic polyisocyanate and having a molecular weight of at least about 500, an hydroxyl number of not more than about 224 and an acid number of not more than about 2.

8. A method for making cellular polyurethane plastics having an improved cellular structure which comprises mixing an organic polyisocyanate, water, an organic compound having at least two reactive hydrogen atoms capable of forming a polyurethane, and an inert gas together, and allowing the resultant mixture to react to form a cellular polyurethane, said inert gas being introduced into the reaction mixture under compression as a stream.

9. A method for making cellular polyurethane plastics having an improved cellular structure which comprises mixing reactants capable of forming a polyurethane, and an inert gas together, and allowing the resultant mixture to react to form a cellular polyurethane, said inert gas being introduced into the reaction mixture under compression as a stream.

References Cited by the Examiner

UNITED STATES PATENTS

| | | | |
|---|---|---|---|
| Re. 24,514 | 8/58 | Hoppe et al. | 260—2.5 |
| 2,962,183 | 11/60 | Rill et al. | 260—2.5 |
| 3,072,582 | 1/63 | Frost | 260—2.5 |

FOREIGN PATENTS

| | | |
|---|---|---|
| 1,130,671 | 10/61 | France. |
| 876,977 | 9/61 | Great Britain. |
| 559,499 | 3/57 | Italy. |

LEON J. BERCOVITZ, *Primary Examiner.*